United States Patent
Finn et al.

(10) Patent No.: US 12,546,605 B2
(45) Date of Patent: Feb. 10, 2026

(54) VEHICLE TRIP BUILDER SYSTEM AND METHOD THEREOF

(71) Applicant: TransCore, LP, Nashville, TN (US)

(72) Inventors: Stephen Finn, Encinitas, CA (US); Hong Chen, Valley Center, CA (US); Michael Lynch, Carlsbad, CA (US)

(73) Assignee: TransCore, LP, Nashville, TN (US)

( * ) Notice: Subject to any disclaimer, the term of this patent is extended or adjusted under 35 U.S.C. 154(b) by 90 days.

(21) Appl. No.: 18/667,924

(22) Filed: May 17, 2024

(65) Prior Publication Data

US 2025/0354815 A1     Nov. 20, 2025

(51) Int. Cl.
    *G01C 21/28* (2006.01)
    *G01C 21/34* (2006.01)
    *G06Q 50/40* (2024.01)

(52) U.S. Cl.
    CPC ......... *G01C 21/28* (2013.01); *G01C 21/3453* (2013.01); *G06Q 50/40* (2024.01)

(58) Field of Classification Search
    CPC ..... G06Q 50/40; H04W 4/40; G01C 21/3492; G01C 21/3461; G07B 15/06
    See application file for complete search history.

(56) References Cited

U.S. PATENT DOCUMENTS

| | | | | |
|---|---|---|---|---|
| 2023/0147526 A1* | 5/2023 | Vangipuram | ......... | G06Q 10/08 701/533 |
| 2024/0420512 A1* | 12/2024 | Sorenson | ......... | G06Q 10/0635 |

* cited by examiner

*Primary Examiner* — Erin M Piateski
*Assistant Examiner* — John C Merino
(74) *Attorney, Agent, or Firm* — Banner & Witcoff, Ltd.

(57) ABSTRACT

A system, and method thereof, is provided for determining a vehicle trip on a roadway. The system may include a plurality of detection zones and a computer program product residing on a non-transitory computer readable medium and executable by one or more processors to direct performance of operations comprising: receiving one or more vehicle detection events corresponding to a given vehicle, each of the one or more vehicle detection events associated with one of a plurality of detection zones; storing a plurality of predefined trip patterns, each of the plurality of predefined trip patterns including at least one detection zone of the plurality of detection zones; and matching the one or more vehicle detection events to a longest matching trip pattern of the plurality of predefined trip patterns to define a trip.

20 Claims, 6 Drawing Sheets

VEHICLE TRIP BUILDER SYSTEM AND METHOD THEREOF

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present disclosure relates generally to automatic toll collection systems, and more particularly, the present disclosure relates to a tolling system having a trip builder system and method implemented therein.

2. Description of the Prior Art

In applications like electronic or automatic toll collection, accurately identifying vehicles on the roadway and tracing their route for billing purposes is essential. Typically, vehicles are identified using transponders read by automatic vehicle identification (AVI) readers along the roadway or at toll collection stations. License plate reading systems, equipped with cameras, capture license plate images that are then processed by automatic optical character recognition (OCR) systems or manually by human operators to extract license plate numbers. However, both transponder and license plate reading systems are prone to errors, impacting the efficiency and revenue of the toll collection system.

Open ticket toll collection systems, which place toll gateways along mainline roadways rather than at entry and exit points, are favored for their reduced infrastructure needs. However, without clear entry and exit points, accurately determining when vehicles enter and exit the roadway becomes challenging. This makes it difficult to bill vehicles on a trip basis or develop accurate traffic models.

A conventional solution has been to charge a fixed amount for each toll gateway crossed. While straightforward, this approach lacks support for trip-based billing, which is desired for various reasons, including facilitating minimum and maximum trip charges, simplifying statements, creating accurate traffic models, and reducing losses from malfunctioning tolling equipment.

Existing systems typically blend electronic and manual toll collection, treating the electronic portion merely as a convenience (e.g., "fast lanes" or "express lanes" for bypassing manual toll booths). However, these systems largely replicate manual tolling rules rather than enabling true trip-based billing.

In complex automatic toll collection systems, system data errors can lead to incorrect billing. Furthermore, toll evasion poses another challenge through stolen or misused transponders and license plates. In conventional systems, error rates range from two percent to ten percent, resulting in lost revenue, increased customer support costs, and dissatisfaction when customers are billed incorrectly. When a vehicle cannot be identified via transponder or license plate reading, toll revenue is forfeited.

It is therefore desirable to develop a reliable trip determination system for open ticket toll collection and combined open ticket and closed ticket systems to support trip-based billing effectively.

BRIEF SUMMARY

In view of at least some of the above-referenced problems in conventional tolling systems and the like, an exemplary object of the present disclosure is to provide a new automatic tolling system and method for determining a vehicle trip on a roadway. An exemplary such method may desirably feature providing and/or defining a plurality of trip patterns. The exemplary such method may further feature providing or receiving one or more vehicle detection events corresponding to a given vehicle wherein each of the one or more vehicle detection events associated with one of a plurality of detection zones. The exemplary such method may further feature matching the one or more vehicle detection events to a longest corresponding trip pattern of the plurality of predefined trip patterns to define a trip. The exemplary such method may further feature matching a first portion of the one or more vehicle detection events to one of the plurality of predefined trip patterns to define a first trip and matching a second portion of the one or more vehicle detection events to a different one of the plurality of predefined trip patterns to define a second trip.

In a particular embodiment, an exemplary method for determining a vehicle trip on a roadway as disclosed herein may include (a) providing one or more vehicle detection events corresponding to a given vehicle, each of the one or more vehicle detection events associated with one of a plurality of detection zones; (b) providing a plurality of predefined trip patterns, each of the plurality of predefined trip patterns including at least one detection zone of the plurality of detection zones; and (c) matching the one or more vehicle detection events to a longest corresponding trip pattern of the plurality of predefined trip patterns to define a trip.

In an exemplary aspect according to the above-referenced embodiment, the one or more vehicle detection events may include at least two vehicle detection events.

In another exemplary aspect according to the above-referenced embodiment, step (c) of the method may further include: determining an average travel time between pairs of detection zones of the plurality of detection zones for each of the plurality of trip patterns that include at least two detection zones of the plurality of detection zones; comparing a travel time of the given vehicle between a pair of detection zones associated with the at least two vehicle detection events with the determined average travel time between the pair of detection zones; and verifying the trip when a difference between the travel time and the average travel time is below a predetermined threshold.

In another exemplary aspect according to the above-referenced embodiment, the determined average travel time may be contemporaneous to the at least two vehicle detection events.

In another exemplary aspect according to the above-referenced embodiment, at least one of the plurality of predefined trip patterns may include non-consecutive detection zones.

In another exemplary aspect according to the above-referenced embodiment, each of the plurality of detection zones may be subdivided based on direction of travel information and each of the plurality of predefined trip patterns may include the direction of travel information.

In another exemplary aspect according to the above-referenced embodiment, at least one of the plurality of predefined trip patterns may include a first detection zone associated with a first direction of travel and a second detection zone associated with a second direction of travel different than the first direction of travel.

In another exemplary aspect according to the above-referenced embodiment, the first detection zone and the second detection zone may be positioned at a common location along the roadway.

In another exemplary aspect according to the above-referenced embodiment, step (c) of the method may further include: matching a first portion of the one or more vehicle detection events to one of the plurality of predefined trip patterns to define a first trip; and matching a second portion of the one or more vehicle detection events to one of the plurality of predefined trip patterns to define a second trip. Each vehicle detection event may be matched to no more than one of the first portion and the second portion.

In another embodiment, an exemplary system for determining a vehicle trip on a roadway as disclosed herein may include a plurality of detection zones and a computer program product residing on a non-transitory computer readable medium and executable by one or more processors to direct performance of operations comprising: receiving one or more vehicle detection events corresponding to a given vehicle, each of the one or more vehicle detection events associated with one of a plurality of detection zones; storing a plurality of predefined trip patterns, each of the plurality of predefined trip patterns including at least one detection zone of the plurality of detection zones; and matching the one or more vehicle detection events to a longest matching trip pattern of the plurality of predefined trip patterns to define a trip.

In an exemplary aspect according to the above-referenced embodiment, the one or more vehicle detection events may include at least two vehicle detection events.

In another exemplary aspect according to the above-referenced embodiment, the computer program product may further configured to direct performance of operations including: determining an average travel time between pairs of detection zones of the plurality of detection zones for each of the plurality of trip patterns that include at least two detection zones of the plurality of detection zones; comparing a travel time of the given vehicle between a pair of detection zones associated with the at least two vehicle detection events with the determined average travel time between the pair of detection zones; and verifying the trip when a difference between the travel time and the average travel time is below a predetermined threshold.

In another exemplary aspect according to the above-referenced embodiment, the determined average travel time may be contemporaneous to the at least two vehicle detection events.

In another exemplary aspect according to the above-referenced embodiment, at least one of the plurality of predefined trip patterns may include non-consecutive detection zones.

In another exemplary aspect according to the above-referenced embodiment, each of the plurality of detection zones may be subdivided based on direction of travel information and each of the plurality of predefined trip patterns may include the direction of travel information.

In another exemplary aspect according to the above-referenced embodiment, at least one of the plurality of predefined trip patterns may include a first detection zone associated with a first direction of travel and a second detection zone associated with a second direction of travel different than the first direction of travel.

In another exemplary aspect according to the above-referenced embodiment, the first detection zone and the second detection zone may be positioned at a common location along the roadway.

In another exemplary aspect according to the above-referenced embodiment, the computer program product is further configured to direct performance of operations including: matching a first portion of the one or more vehicle detection events to one of the plurality of predefined trip patterns to define a first trip; and matching a second portion of the one or more vehicle detection events to one of the plurality of predefined trip patterns to define a second trip. Each vehicle detection event may be matched to no more than one of the first portion and the second portion.

In another exemplary aspect according to the above-referenced embodiment, at least a portion of the plurality of predefined trip patterns may include various sequences of the plurality of detection zones.

In a further embodiment, an exemplary method for determining a vehicle trip on a roadway may include (a) providing one or more vehicle detection events corresponding to a given vehicle, each of the one or more vehicle detection events associated with a detection zone; (b) providing at least one predefined trip pattern including the detection zone; and (c) matching the one or more vehicle detection events to a longest matching trip pattern of the at least one predefined trip pattern to define a trip.

DETAILED DESCRIPTION

Figure 1:
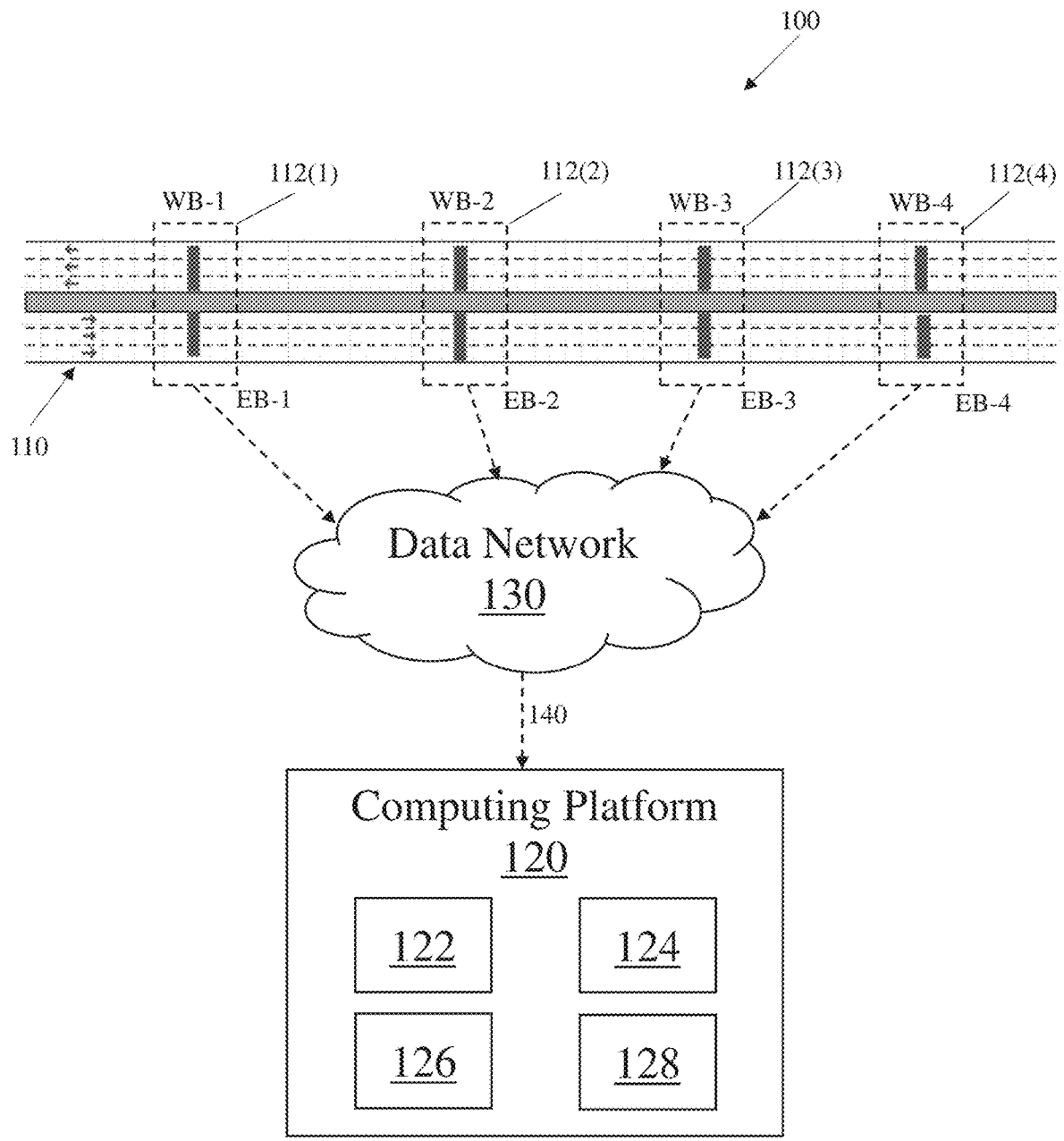
FIG. 1 is a diagram of an embodiment of a system in accordance with the present disclosure.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," "optional embodiment" or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(n)" where n may include a number. Referring to one of the elements as "Element 102" refers to any single element of the Elements 102(1)-(n). Additionally, referring to different elements "First Elements 102(1)-(n)" and "Second Elements 104(1)-(n)" does not necessarily mean that there must be the same number of First Elements as Second Elements and is equivalent to "First Elements 102(1)-(n) and "Second Elements (1)-(m)" where m is a number that may be the same or may be a different number than n.

As used herein, the term "computing device" may include a desktop computer, a laptop computer, a tablet computer, a mobile device such as a mobile phone or a smart phone, a smartwatch, a gaming console, an application server, a database server, or some other type of computing device. A computing device may include a physical computing device or may include a virtual machine (VM) executing on another computing device. A computing device may include a cloud computing system, a distributed computing system, or another type of multi-device system.

As used herein, the term "data network" may include a local area network (LAN), wide area network (WAN), the Internet, or some other network. A data network may include one or more routers, switches, repeaters, hubs, cables, or other data communication components. A data network may include a wired connection or a wireless connection.

As used herein, the term "computing platform" or "platform" may include a computing environment where a portion of software can execute. A computing platform may include hardware on which the software may execute. The computing platform may include an operating system. The computing platform may include one or more software applications, scripts, functions, or other software. The computing platform may include one or more application programming interfaces (APIs) by which different portions of the software of the platform may communicate with each other or invoke functions. The computing platform may include one or more APIs by which it may communicate with external software applications or by which external software applications may interact with the platform. The computing platform may include a software framework. The computing platform may include one or more VMs. The computing platform may include one or more data storages. The computing platform may include a client application that executes on an external computing device and that interacts with the platform in a client-server architecture.

As used herein, the terms "determine" or "determining" may include a variety of actions. For example, "determining" may include calculating, computing, processing, deriving, looking up (e.g., looking up in a table, a database or another data structure), ascertaining, or other actions. Also, "determining" may include receiving (e.g., receiving information or data), accessing (e.g., accessing data in a memory, data storage, distributed ledger, or over a network), or other actions. Also, "determining" may include resolving, selecting, choosing, establishing, or other similar actions.

As used herein, the terms "provide" or "providing" may include a variety of actions. For example, "providing" may include generating data, storing data in a location for later retrieval, transmitting data directly to a recipient, transmitting or storing a reference to data, or other actions. "Providing" may also include encoding, decoding, encrypting, decrypting, validating, verifying, or other actions.

As used herein, the term "user interface" (also referred to as an interactive user interface, a graphical user interface or a UI), may refer to a computer-provided interface including data fields or other controls for receiving input signals or providing electronic information or for providing information to a user in response to received input signals. A user interface may be implemented, in whole or in part, using technologies such as hyper-text mark-up language (HTML), a programming language, web services, or rich site summary (RSS). In some implementations, a user interface may be included in a stand-alone client software application configured to communicate in accordance with one or more of the aspects described, such software application able to both send and receive pertinent performance data.

Figure 2:
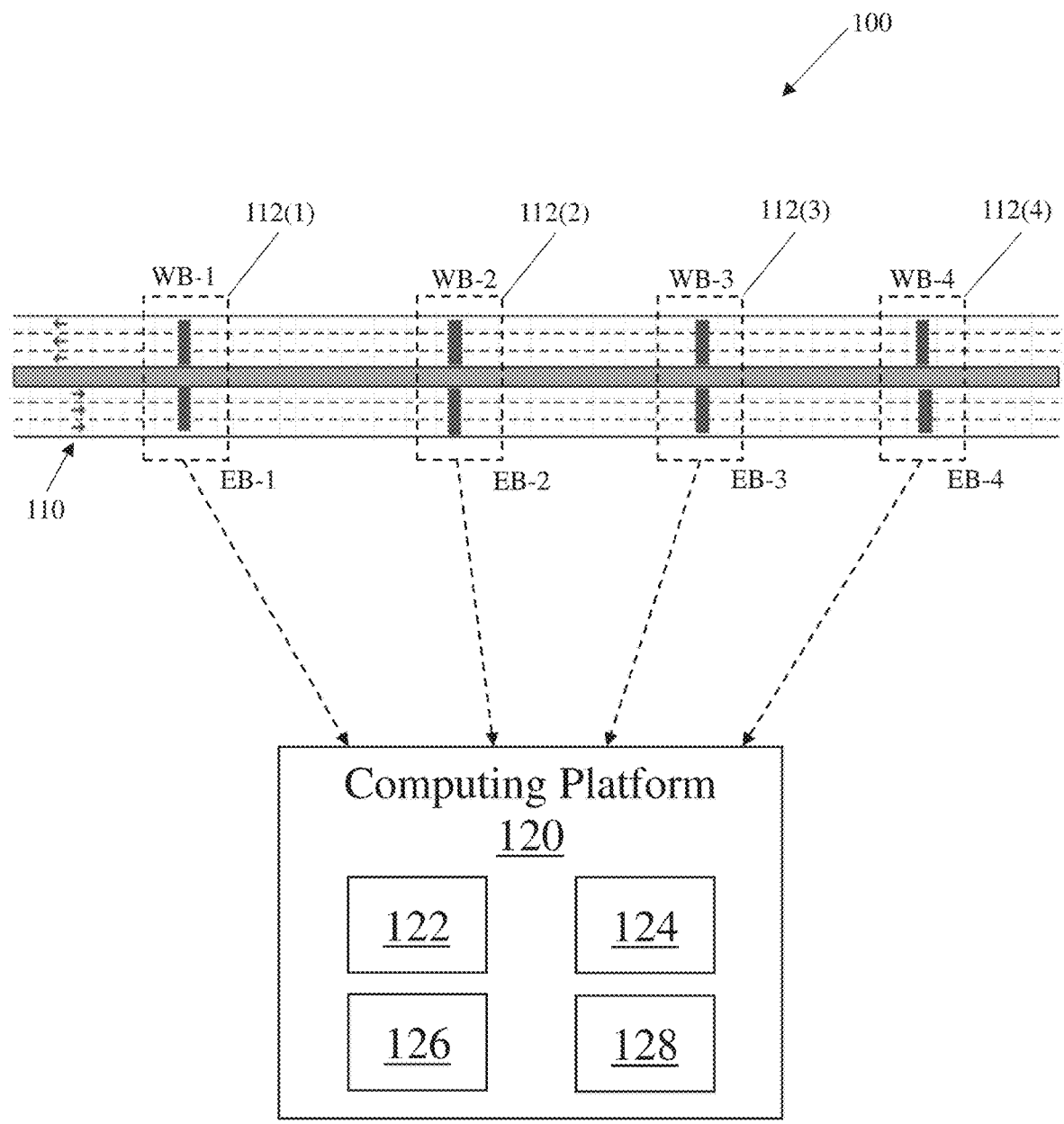
FIG. 2 is a diagram of another embodiment of a system in accordance with the present disclosure.

Referring to FIGS. 1-2, a system 100 for determining a vehicle trip on a roadway 110 is provided. The roadway 110 including at least one detection zone 112. The at least one detection zone 112 may also be referred to herein as a tolling station 112 or detection point 112. In certain optional embodiments, the roadway 110 may include a plurality of detection zones (e.g., 112(1), 112(2), 112(3), 112(4), etc.).

The system 100 may further include a computer program product 120 to analyze data (e.g., one or more vehicle detection events 140) received from the at least one detection zone 112. The computer program product 120 may also be referred to herein as a computing platform 120. In certain optional embodiments, as illustrated in FIG. 1, the computing platform 120 may be located remotely from the at least one detection zone 112, with the system 100 further including a data network 130 for communicating with the at least one detection zone 112. In other optional embodiments, as illustrated in FIG. 2, the computing platform 120 may be directly linked to each of the at least one detection zone 112. The computing platform 120 may include or reside on a non-transitory computer readable medium 122 and may be executable by one or more processors 124. The computing platform 120 may further include data storage 126. The one or more vehicle detection events 140 may be received by the computing platform 120 using the data network 130 or directly.

The system 100, or more specifically, the computing platform 120 may include a user interface (UI) 128 executable on the computing platform 120. In certain optional embodiments, the UI 128 may be executable on a computing device coupled to or wirelessly linked to the computing platform 120.

Figure 6:
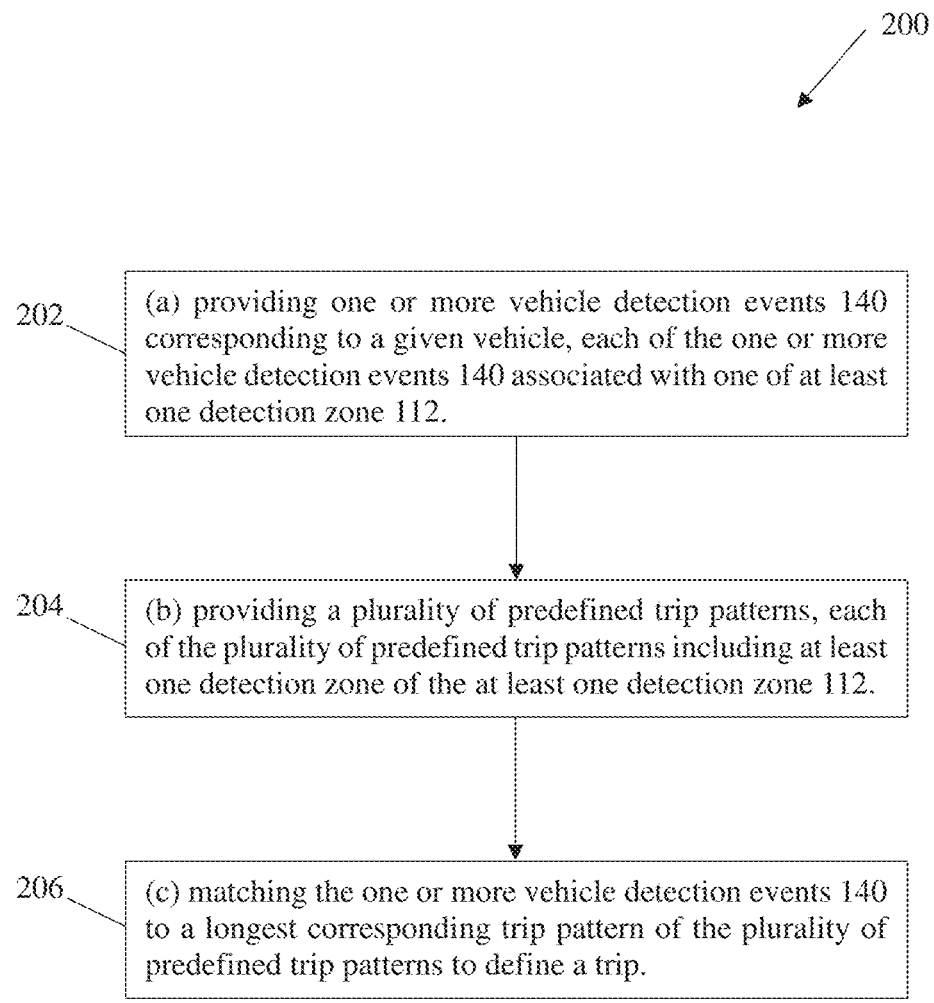
FIG. 6 is a flowchart of an embodiment of a method in accordance with the present disclosure.

The computing platform 120 may be executable by the one or more processors 124 to direct performance of operations, which may be represented by a method 200 (as shown in FIG. 6) for determining a vehicle trip on the roadway 110. As such, the method 200 is executable by the system 100.

The method 200 may include (a) providing 202 one or more vehicle detection events 140 corresponding to a given vehicle. Each of the one or more vehicle detection events 140 may be associated with one of the at least one detection zone 112. As discussed above, the one or more vehicle detection events 140 may be received from the at least one detection zone 112.

The method 200 may further include (b) providing a plurality of predefined trip patterns (e.g., as show in Tables 1-4 below). Each of the plurality of predefined trip patterns may include at least one of the at least one detection zones 112. The plurality of predefined trip patterns may be received by and stored on the computing platform 120. The plurality of predefined trip patterns are infinitely customizable based on the needs of a tolling authority or tolling agency. As such, the plurality of predefined trip patterns may be programmed or selected by the tolling authority. For example, there may be n! (n factorial) possible trip patterns when considering a single direction of travel, where n equals the number of detections zones positioned along the roadway in a same direction of travel. Further for example, there may be n! (n factorial) possible trip patterns when considering a single direction of travel when considering only the opposite direction of travel. Further, there may be two (2) times n! (n factorial) possible trip patterns when considering both directions of travel, however, more trip patterns may be possible when considering trip patterns that include detections zones more than once, and more than one direction of travel.

The method 200 may further include (c) matching the one or more vehicle detection events 140 to a longest corresponding trip pattern of the plurality of predefined trip patterns to define a trip, as further discussed in the examples below. Once the trip has been matched to the vehicle, a toll fee may be charged to the user of the vehicle or an account associated with the vehicle.

In certain optional embodiments, the one or more vehicle detection events 140 may include at least two vehicle detection events. In accordance with this embodiment, step (c) of the method 200 may further include determining an average travel time between pairs of detection zones 112 for each of the plurality of trip patterns that include at least two detection zones 112, comparing an actual travel time of the given vehicle between a pair of detection zones 112 associated with the at least two vehicle detection events with the determined average travel time between the pair of detection zones 112, and verifying the trip when a difference between the travel time and the average travel time is below a predetermined threshold. The trip may be verified according to the above embodiment prior to processing the toll fee. In certain optional embodiments, predetermined threshold may be 10% greater than the average travel time. In other optional embodiments, the predetermined threshold may be 20% greater than the average travel time. In other optional embodiments, the predetermined threshold may be 30% greater than the average travel time. In other optional embodiments, the predetermined threshold may be 40% greater than the average travel time. In other optional embodiments, the predetermined threshold may be 50% greater than the average travel time.

The average travel time may be contemporaneous to the at least two vehicle detection events. In other words, the average travel time may be calculated based on other vehicles traveling through the pair of detection zones prior to the given vehicle. The average travel time may be calculated based on other vehicles traveling through the pair of detection zones during a predefined time interval immediately preceding the at least two vehicle detection events of the given vehicle. In certain optional embodiments, the predefined time interval may be less than or equal to thirty (30) minutes. In other optional embodiments, the predefined time interval may be less than or equal to twenty-five (25) minutes. In other optional embodiments, the predefined time interval may be less than or equal to twenty (20) minutes. In other optional embodiments, the predefined time interval may be less than or equal to fifteen (15) minutes. In other optional embodiments, the predefined time interval may be less than or equal to ten (10) minutes. In other optional embodiments, the predefined time interval may be less than or equal to five (5) minutes. In other optional embodiments, the predefined time interval may be less than or equal to three (3) minutes. In other optional embodiments, the predefined time interval may be less than or equal to one (1) minute.

Referring to FIGS. 1-5, different embodiments of the roadway 110 are provided. An example of allowable predefined trip patterns corresponding to FIGS. 1-2 is shown in Table 1 below.

TABLE 1

| Predefined Trip Patterns |
| --- |
| EB-1 |
| EB-1, EB-2 |
| EB-1, EB-3 |
| EB-1, EB-2, EB-3 |
| EB-2 |
| EB-2, EB-3 |
| EB-3 |
| EB-4 |
| EB-1, WB-1 |
| EB-2, WB-1 |
| WB-4, WB-3, WB-2, WB-1 |
| WB-4, WB-3, EB-3, EB-4 |
| WB-3, EB-3, EB-4 |

Transactions for the same vehicle are grouped together for trip building, for example due to a same license plate or a same RFID device being read at each of the at least one detection zone 112. Trip delineation depends on the toll agency's business rules. For example, transactions at Eastbound Plazas EB-1, EB-2, and EB-3 may be grouped into a trip, while EB-4 is considered a separate trip. Where a trip is formed across multiple vehicle detection events, a single toll is charged for the entire trip, as opposed to prior methodologies which charge a toll for each individual transaction. As can be seen in FIGS. 1-2 and Table 1, each of the at least one detection zones 112 may be subdivided based on direction of travel information and each of the plurality of predefined trip patterns may include the direction of travel information.

In certain optional embodiments according to Table 1, the one or more vehicle detection events 140 corresponding to the given vehicle may include EB-1 and EB-2. In accordance with this embodiment, the system 100 may match the one or more vehicle detection events 140 to trip pattern EB-1, EB-2. The system 100 may further determine the average travel time between EB-1 and EB-2 and compare the actual travel time of the given vehicle with the determined average travel time based on the predetermined threshold for trip verification purposes. For example, the given vehicle may remain on the roadway 110 between EB-1 and EB-2 and its actual travel time may be less than the predetermined threshold, in which case the trip is verified. In other example, the given vehicle may exit the roadway 110 and re-enter the roadway 110 between EB-1 and EB-2, thus causing its actual travel time to be greater than the average travel time and thereby causing the system 100 to split the trip into two separate toll fees rather than a trip toll fee.

In some embodiments according to Table 1, the one or more vehicle detection events 140 corresponding to the given vehicle may include only one of EB-1, EB-2, EB-3, EB-4. In this case, a trip may be defined with a single vehicle detection event. In other embodiments, the trip patterns may exclude single detection events from being defined as trips.

In other optional embodiments according to Table 1, the one or more vehicle detection events 140 corresponding to the given vehicle may include EB-1 and EB-3. In accordance with this embodiment, the detection zone at EB-2 may have not detected the given vehicle, or the given vehicle may have exited the roadway 110 prior to EB-2 and re-entered the roadway 110 after EB-2. In accordance with this embodiment, the system 100 may match the one or more vehicle detection events 140 to trip pattern EB-1, EB-3. The system 100 may further determine the average travel time between EB-1 and EB-3 and compare the actual travel time of the given vehicle with the determined average travel time based on the predetermined threshold for trip verification purposes. As such, at least one of the predefined trip patterns may include non-consecutive or non-adjacent detection zones 112 if the actual travel time of the vehicle is less than the determined average travel time based on the predetermined threshold.

In further optional embodiments according to Table 1, the one or more vehicle detection events 140 corresponding to the given vehicle may include EB-1 and WB-1. For example, the given vehicle may have exited while traveling eastbound on the roadway 110 after EB-1 and re-entered the roadway 110 westbound prior to WB-1. In accordance with this embodiment, the system 100 may forgo the verification process using a determined average travel time. This embodiment illustrates a trip including a first detection zone associated with a first direction of travel and a second detection zone associated with a second direction of travel different than the first direction of travel. Additionally, this embodiment illustrates the first and second detection zones being in a common location along the roadway 110, thus meaning that a trip involving a U-turn may be programmed and is acceptable. However, from Table 1, it is noted that it is possible to define a trip pattern as including different directions of travel based on detection zones positioned at different locations along the roadway 110 (e.g., EB-2, WB-1).

In further optional embodiments according to Table 1, the one or more vehicle detection events 140 corresponding to the given vehicle may include EB-1, EB-2, EB-3, and EB-4. In accordance with this embodiment, the method 200 may match a first portion of the one or more vehicle detection events 140 to one of the plurality of predefined trip patterns (e.g., EB-1, EB-2, EB-3) to define a first trip, and match a second portion of the one or more vehicle detection events 140 to one of the plurality of predefined trip patterns (e.g., EB-4) to define a second trip. It is noted that each vehicle detection event may be matched to no more than one of the first portion or the second portion.

In other optional embodiments, the one or more vehicle detection events 140 corresponding to the given vehicle may include various other combinations which may or may not match with one or more of the predefined trip patterns.

Figure 3:
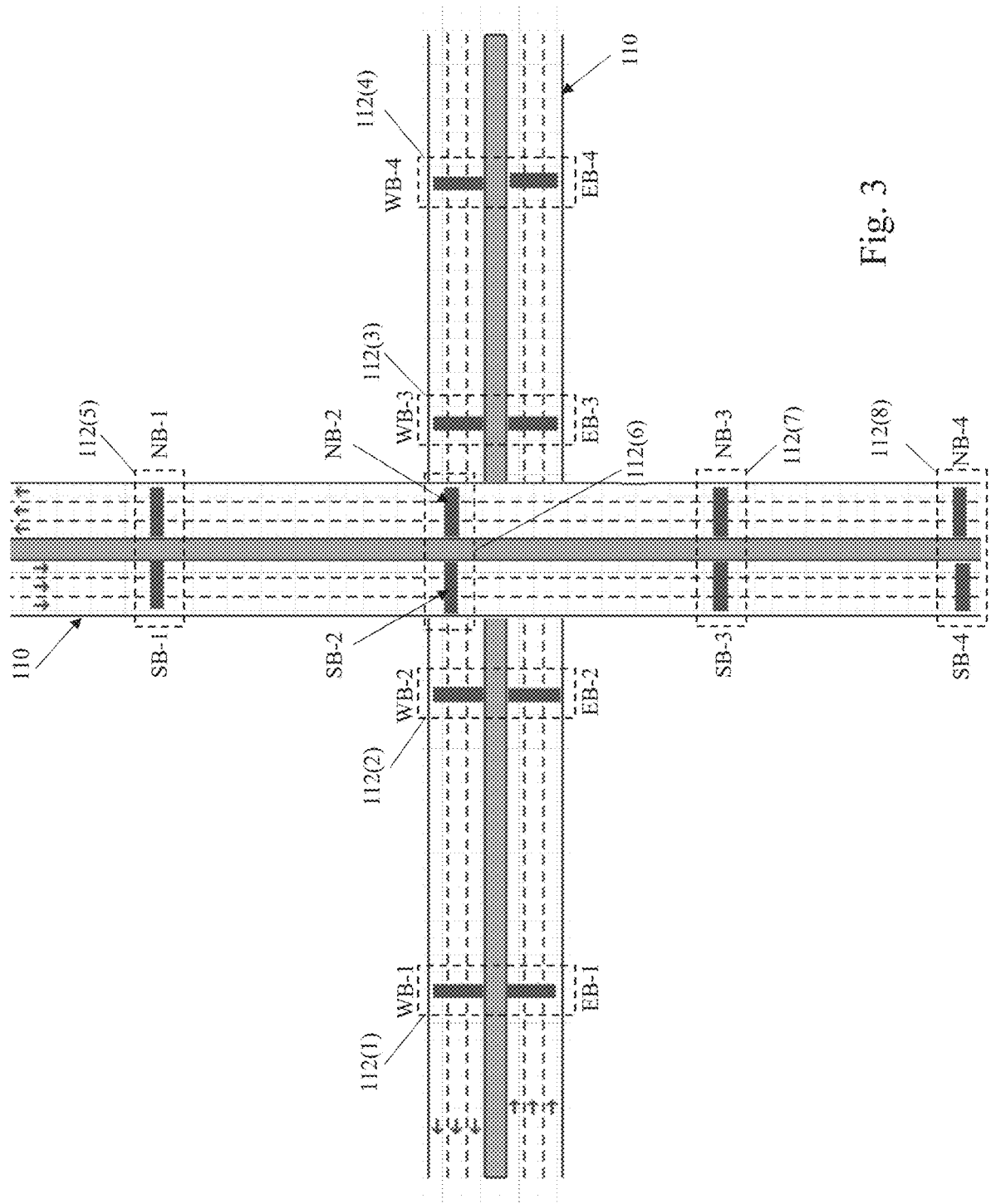
FIG. 3 is a diagram of an embodiment of a roadway of the system of FIG. 1 or 2 in accordance with the present disclosure.

Another example of allowable predefined trip patterns corresponding to FIG. 3 is shown in Table 2 below.

TABLE 2

| Predefined Trip Patterns |
| --- |
| EB-1, EB-2 |
| EB-1, EB-2, EB-3 |
| EB-1, EB-2, EB-3, EB-4 |
| EB-1, EB-3 |
| EB-2, EB-3 |
| EB-2, EB-4 |
| EB-1, EB-2, NB-2, NB-1 |
| EB-3, EB-4 |
| EB-2, NB-2 |
| SB-1, SB-2, WB-2, WB-1 |
| NB-4, NB-3, NB-2 |
| NB-4, NB-3, EB-3, EB-4 |
| NB-2, SB-2 |

In certain optional embodiments, the one or more vehicle detection events 140 corresponding to the given vehicle may include EB-1, EB-2, NB-2, NB-1, SB-1, SB-2, WB-2, WB-1. In accordance with this embodiment, the method 200 may match a first portion of the one or more vehicle detection events 140 to one of the plurality of predefined trip patterns (e.g., EB-1, EB-2, NB-2, NB-1) to define a first trip, and match a second portion of the one or more vehicle detection events 140 to one of the plurality of predefined trip patterns (e.g., SB-1, SB-2, WB-2, WB-1) to define a second trip. The system 100 may verify the first and second trips by comparing the actual travel time with the determined average travel time based on the predetermined threshold for each pair of detection zones 112.

In other optional embodiments, the one or more vehicle detection events 140 corresponding to the given vehicle may include various other combinations which may or may not match with one or more of the predefined trip patterns.

Figure 4:
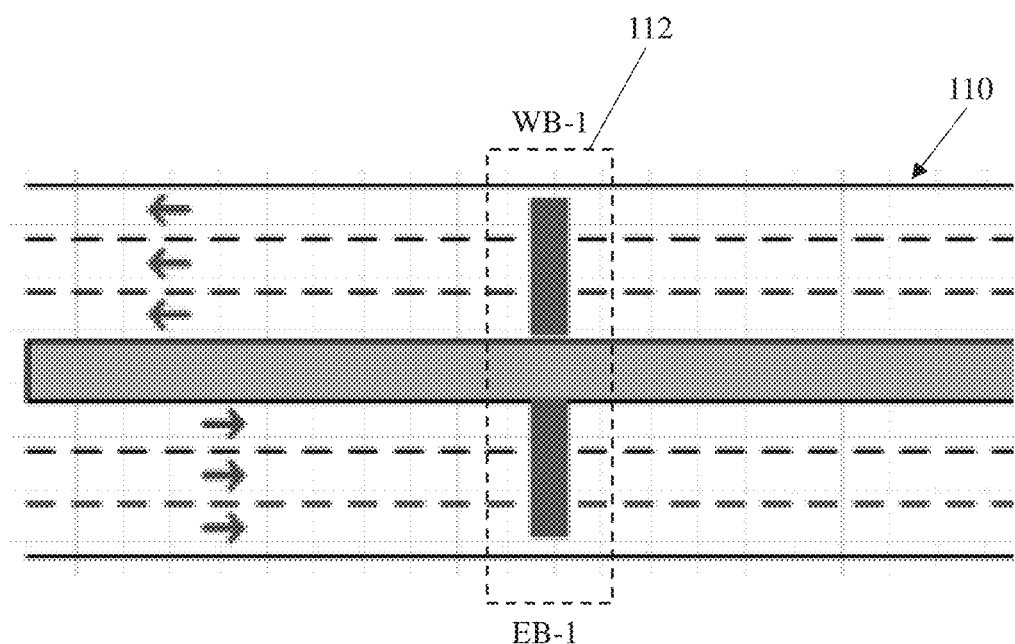
FIG. 4 is a diagram of another embodiment of a roadway of the system of FIG. 1 or 2 in accordance with the present disclosure.

A further example of allowable predefined trip patterns corresponding to FIG. 4 is shown in Table 3 below.

TABLE 3

| Predefined Trip Patterns |
| --- |
| EB-1 |
| EB-1, WB-1 |
| WB-1 |
| WB-1, EB-1 |

In certain optional embodiments, the one or more vehicle detection events 140 corresponding to a given vehicle may include EB-1. As discussed above with regard to Table 1, this embodiment illustrates a trip may be defined with a single vehicle detection event.

In other optional embodiments, the one or more vehicle detection events 140 corresponding to a given vehicle may include EB-1 and EB-2. As discussed above with regard to Table 1, this embodiment illustrates a trip including a first detection zone associated with a first direction of travel and a second detection zone associated with a second direction of travel different than the first direction of travel.

In accordance with FIG. 4 and Table 3, an embodiments of the method 200 may include (a) providing one or more vehicle detection events 140 corresponding to a given vehicle, each of the one or more vehicle detection events 140 associated with a detection zone 112; (b) providing at least one predefined trip pattern including the detection zone 112; and (c) matching the one or more vehicle detection events 140 to a longest matching trip pattern of the at least one predefined trip pattern to define a trip.

Figure 5:
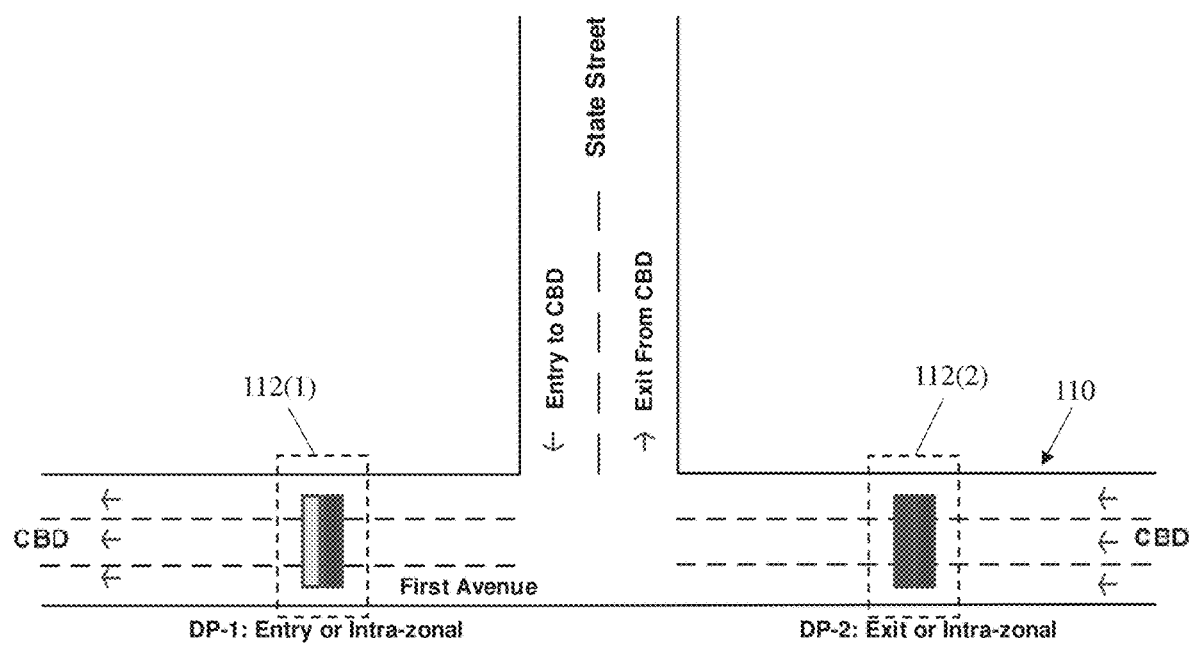
FIG. 5 is a diagram of another embodiment of a roadway of the system of FIG. 1 or 2 in accordance with the present disclosure.

As illustrated in FIG. 5, the system 100 may be compatible with congestion pricing systems, such as, for example, a Central Business District (CBD) of an urban area. In such an embodiment, the at least one detection zone 112 of the CBD may include entry zones associated with entering the CBD, exit zones associated with exiting the CBD, intra-zonal zones positioned within the CBD, and various other special case zones. An example of allowable predefined trip patterns corresponding to the CBD of FIG. 5 is shown in Table 4 below.

TABLE 4

| Predefined Trip Patterns |
| --- |
| DP-2, DP-1 |
| DP-1 |
| DP-2 |

The detection zones in the CBD can have different roles depending on the full pattern of the one or more vehicle detection events 140. For example, if a vehicle detection event occurs at detection point one (DP-1), then the vehicle entered the CBD using State Street by turning right on First Avenue, however, if the DP-1 event is preceded by detection point two (DP-2), then the vehicle was already in the CBD and was traveling along First Avenue. Further for example, if the last event occurred at DP-2, then the vehicle exited the CBD by turning right on State Street, and if DP-2 is succeeded by DP-1, then the vehicle remained in the CBD and continued traveling along First Avenue. The determination of which role a detection point plays may be based on configurable patterns, as shown in Table 5 below.

TABLE 5

| | Prior DP Type | Current DP Type | Next DP Type | Role of DP |
| --- | --- | --- | --- | --- |
| DP-1 | Exit/Intra-zonal | Entry/Intra-zonal | None | Intra-zonal |
| DP-1 | None | Entry/Intra-zonal | None | Entry |
| DP-2 | None | Exit/Intra-zonal | Entry/Intra-zonal | Intra-zonal |
| DP-2 | None | Exit/Intra-zonal | None | Exit |

Table 5 illustrates the importance of the type of detection point that precedes the current vehicle detection event when in the CBD, as well as the type of detection point that succeeds the current vehicle detection event. Rows 1 and 2 of Table 5 show the behavior of DP-1, which is either "entry" or "intra-zonal", and rows 3 and 4 show the behavior of DP-2, which is either "exit" or "intra-zonal". In Table 4 row 1 and Table 5 row 1, DP-1 is preceded by DP-2, so DP-1 is intra-zonal. In Table 4 row 2 and Table 5 row 2, DP-1 is by itself, so DP-1 is "entry". In Table 4 row 1 and Table 5 row 3, DP2 is succeeded by DP-1, so DP-2 is "intra-zonal". In Table 4 row 3 and Table 5 row 4, DP-2 is by itself, so DP-2 is "exit".

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In some embodiments, a module, system, subsystem, or a portion thereof may be implemented as a hardware circuit comprising custom (very large-scale integration) VLSI circuits or gate arrays, off-the-shelf semiconductors such as logic chips, transistors, or other discrete components. A module, system, subsystem, or a portion thereof may also be implemented in programmable hardware devices such as field programmable gate arrays, programmable array logic, programmable logic devices or the like.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Thus, although there have been described particular embodiments of the present disclosure of new and useful systems and methods dynamically providing content, it is not intended that such references be construed as limitations upon the scope of this disclosure.

What is claimed is:

1. A method for determining a vehicle trip on a roadway, the method comprising:
    (a) providing one or more vehicle detection events corresponding to a given vehicle, each of the one or more vehicle detection events associated with one of a plurality of detection zones;
    (b) providing a plurality of predefined trip patterns, each of the plurality of predefined trip patterns including at least one detection zone of the plurality of detection zones; and
    (c) matching the one or more vehicle detection events to a longest corresponding trip pattern of the plurality of predefined trip patterns to define a trip.

2. The method of claim 1, wherein the one or more vehicle detection events includes at least two vehicle detection events.

3. The method of claim 2, wherein step (c) further comprises:
    determining an average travel time between pairs of detection zones of the plurality of detection zones for each of the plurality of predefined trip patterns that include at least two detection zones of the plurality of detection zones;
    comparing a travel time of the given vehicle between a pair of detection zones associated with the at least two vehicle detection events with the determined average travel time between the pair of detection zones; and
    verifying the trip when a difference between the travel time and the average travel time is below a predetermined threshold.

4. The method of claim 3, wherein the determined average travel time is contemporaneous to the at least two vehicle detection events.

5. The method of claim 1, wherein at least one of the plurality of predefined trip patterns includes non-consecutive detection zones.

6. The method of claim 1, wherein each of the plurality of detection zones are subdivided based on direction of travel information and each of the plurality of predefined trip patterns includes the direction of travel information.

7. The method of claim 6, wherein at least one of the plurality of predefined trip patterns includes a first detection zone associated with a first direction of travel and a second detection zone associated with a second direction of travel, the second direction of travel different than the first direction of travel.

8. The method of claim 7, wherein the first detection zone and the second detection zone are in a common location along the roadway.

9. The method of claim 1, wherein step (c) further comprises:
    matching a first portion of the one or more vehicle detection events to one of the plurality of predefined trip patterns to define a first trip; and
    matching a second portion of the one or more vehicle detection events to one of the plurality of predefined trip patterns to define a second trip, wherein each vehicle detection event is matched to no more than one of the first portion and the second portion.

10. A system for determining a vehicle trip on a roadway, the system comprising:
- a plurality of detection zones; and
- a computer program product residing on a non-transitory computer readable medium and executable by one or more processors to direct performance of operations comprising:
- receiving one or more vehicle detection events corresponding to a given vehicle, each of the one or more vehicle detection events associated with one of a plurality of detection zones;
- storing a plurality of predefined trip patterns, each of the plurality of predefined trip patterns including at least one detection zone of the plurality of detection zones; and
- matching the one or more vehicle detection events to a longest matching trip pattern of the plurality of predefined trip patterns to define a trip.

11. The system of claim 10, wherein the one or more vehicle detection events includes at least two vehicle detection events.

12. The system of claim 11, wherein the computer program product is further configured to direct performance of operations including:
- determining an average travel time between pairs of detection zones of the plurality of detection zones for each of the plurality of predefined trip patterns that include at least two detection zones of the plurality of detection zones;
- comparing a travel time of the given vehicle between a pair of detection zones associated with the at least two vehicle detection events with the determined average travel time between the pair of detection zones; and
- verifying the trip when a difference between the travel time and the average travel time is below a predetermined threshold.

13. The system of claim 12, wherein the determined average travel time is contemporaneous to the at least two vehicle detection events.

14. The system of claim 10, wherein at least one of the plurality of predefined trip patterns includes non-consecutive detection zones.

15. The system of claim 10, wherein each of the plurality of detection zones are subdivided based on direction of travel information and each of the plurality of predefined trip patterns includes the direction of travel information.

16. The system of claim 15, wherein at least one of the plurality of predefined trip patterns includes a first detection zone associated with a first direction of travel and a second detection zone associated with a second direction of travel, the second direction of travel different than the first direction of travel.

17. The system of claim 16, wherein the first detection zone and the second detection zone are in a common location along the roadway.

18. The system of claim 10, wherein the computer program product is further configured to direct performance of operations including:
- matching a first portion of the one or more vehicle detection events to one of the plurality of predefined trip patterns to define a first trip; and
- matching a second portion of the one or more vehicle detection events to one of the plurality of predefined trip patterns to define a second trip, wherein each vehicle detection event is matched to no more than one of the first portion and the second portion.

19. The system of claim 10, wherein at least a portion of the plurality of predefined trip patterns includes various sequences of the plurality of detection zones.

20. A method for determining a vehicle trip on a roadway, the method comprising:
- (a) providing one or more vehicle detection events corresponding to a given vehicle, each of the one or more vehicle detection events associated with a detection zone;
- (b) providing at least one predefined trip pattern including the detection zone; and
- (c) matching the one or more vehicle detection events to a longest matching trip pattern of the at least one predefined trip pattern to define a trip.

* * * * *